Dec. 21, 1954     L. F. BENDER     2,697,412
MILKING MACHINE PAIL LID
Filed Feb. 18, 1952
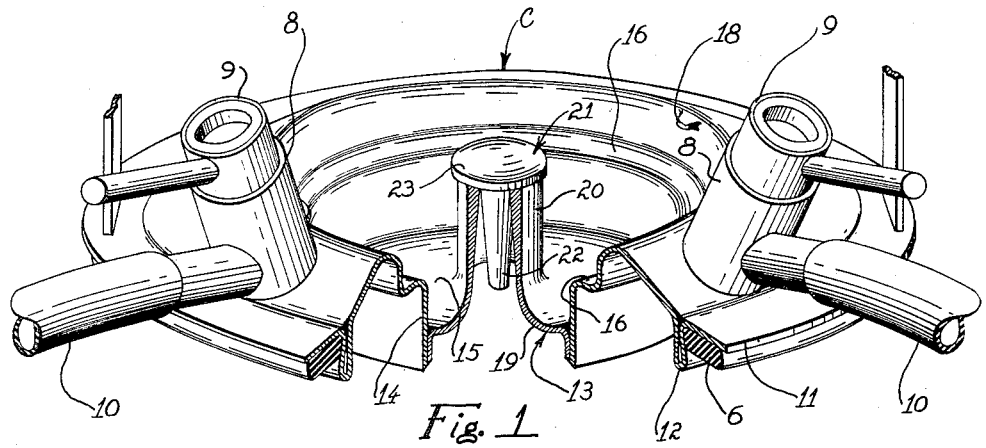
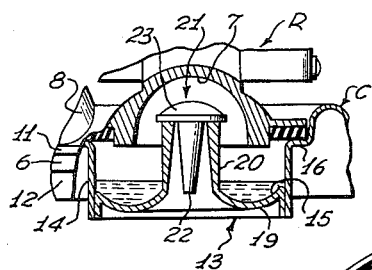
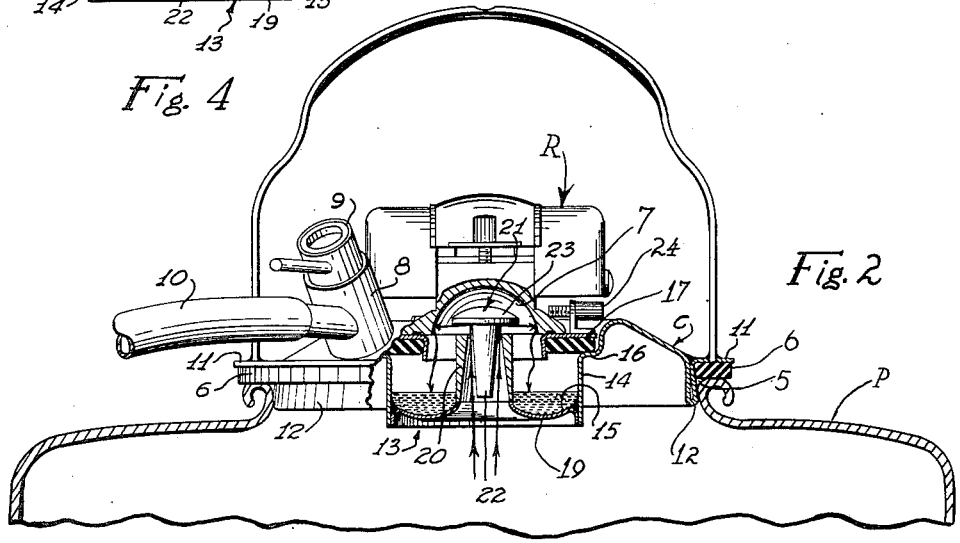
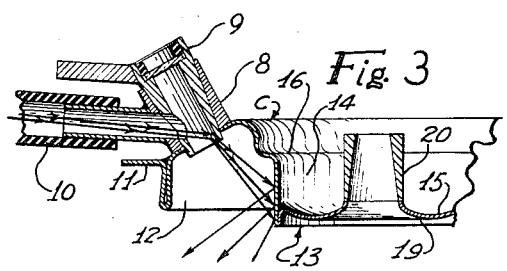
INVENTOR
LLOYD F. BENDER
BY
Williamson & Williamson
ATTORNEYS

United States Patent Office 2,697,412
Patented Dec. 21, 1954

2,697,412

MILKING MACHINE PAIL LID

Lloyd F. Bender, Hayward, Wis., assignor to National Cooperatives, Inc., Chicago, Ill., a corporation of the District of Columbia Application February 18, 1952, Serial No. 272,176

8 Claims. (Cl. 119—14.40)

This invention relates to milking machines. More particularly, it relates to lids or covers for milking machine pails of either the suspended or non-suspended type.

In the operation of conventional milking machines wherein a pulsator is mounted upon the lid of the milking machine pail in superimposed relation, an appreciable amount of vapor and multitudinous tiny particles of milk and water are automatically drawn upwardly from the interior of the pail and into the dome-like inner cavity of the pulsator. Most of this vapor condenses and many of the tiny particles of liquid milk and water join to form an appreciable amount of liquid upon the walls of the cavity. This milk and water is contaminated by its contact with the walls of the pulsator cavity and when it has collected in sufficient quantities to flow, it will, in many types of milking machines, flow back into the pail and contaminate the milk. My invention is directed toward eliminating this contamination by constructing the lid or cover for the pail in a manner such as to positively eliminate such contamination or at least reduce it to a minimum.

It is a general object of my invention to provide a novel and improved lid or cover member for the pail of a milking machine, the lid being of cheap and simple construction and having greatly increased sanitation.

A more specific object is to provide a novel and improved lid or cover member for the pail of a milking machine constructed to positively prevent contaminated milk from returning to the interior of the milking machine pail and contaminating the milk within the pail.

Another object is to provide a novel and improved lid for a milking machine pail constructed to maintain at a minimum the amount of milk withdrawn from the pail and into contact with the interior of the pulsator.

Another object is to provide a novel and improved cover for a milking machine pail constructed to provide means for collecting any and all liquid drawn upwardly therethrough and into contact with the interior of the pulsator and for positively retaining the same within the confines of the cover but exteriorly of the pail.

These and other objects and advantages of my invention will more fully appear from the following description made in connection with the accompanying drawings, wherein like reference characters refer to similar parts throughout the several views and in which:

Fig. 1 is a perspective view of one embodiment of the invention with a portion thereof broken away to show its structure in section and with the upper portion of the handle also broken away.

Fig. 2 is a side elevational view of the invention with the pulsator superimposed thereupon in operating position and with the interior of the structure shown in section, the entire unit being shown in position above a milking machine pail which is shown in broken lines.

Fig. 3 is an enlarged fragmentary sectional view taken through one of the spigots and radially of the cover member to show the functions of the skirt member.

Fig. 4 is a fragmentary side elevational view of the invention with portions thereof broken away and with the pulsator superimposed directly thereupon in operating position to illustrate how the unit will appear when the lid and pulsator are of complementary sizes.

One embodiment of my invention may include, as shown in Figs. 1–3, a lid cover or member indicated generally as C which is adapted to fit snugly over an opening 5 normally found in the upper portions of a milking machine pail indicated in Fig. 2 as P. As shown, the cover member C is provided with a rubber ring member 6 around its marginal portions to insure an air-tight fit between the lid member C and the pail P. In this respect, the lid member is conventional. Also shown in Fig. 2 mounted in superimposed relation to the lid member C is a pulsator indicated generally as R, this pulsator having an interior dome-like cavity 7 from which the air is exhausted by the pulsator mechanism to create a partial vacuum within the interior of the pail P in the manner to be hereinafter described. As shown, the cover member C is provided with a pair of diagonally and inwardly extending spigots 8 and 9. These spigots provide inlets into the interior of the pail through which the milk enters. Each of these spigots 8 and 9 is connected by a rubber hose 10 which in turn is connected to the claw (not shown) which engages the teats of the cow during the milking operation. It will be noted that each of the spigots 8 and 9 extends inwardly along a radial line with respect to the cover member C in the conventional manner for such spigots on milking machine pail lids. The structure outlined heretofore may be found in any milking machine pail lid previously known and constitutes no part of the invention claimed herein.

As shown, the lid member C is formed integrally. This, of course, is not an absolute necessity but it is contemplated that manufacture of the item will be facilitated by so constructing the lid. As shown, the lid C has an outer portion which is formed into a substantially horizontally extending flange element 11. The material immediately inwardly of the flange element 11 is bent downwardly and then reversed upon itself to form a depending flange 12 which, as shown in Fig. 2, is slightly smaller than the mouth or opening 5 of the pail P and serves to position the lid member upon the pail so that the rubber ring 6 will form an air-tight connection therewith when the air is exhausted from the interior of the pail. The lid member C also has an inner portion 13 which is depressed substantially to a position well below the inlet of the spigots 8 and 9. By depressing the inner portion 13, upstanding walls 14 are formed which provide a well indicated as 15 within the inner portion of the lid member. This entire well structure may also be considered as the intermediate portion of the lid member C. The upstanding walls 14 of the well are so formed as to provide a shoulder 16 along the upper portions of the well, this shoulder being adapted to receive an adapter ring 17 thereupon. The adapter ring is held in place by a pair of oppositely and inwardly extending lugs 18.

The material of the lid member C inwardly of the skirt 14 comprises an inwardly extending panel 19 which forms a bottom for the well and the material inwardly of the panel 19 is drawn upwardly into an upstanding tubular element 20. This tubular element may be considered to be the central portion of the lid member C and will be so referred to hereinafter. It will be noted that the tubular member 20 which is open at its upper end provides a well or catch basin in conjunction with the skirt 14. It will also be noted that the skirt 14 extends in close proximity to the inlet of the spigots.

The tubular element 20 is adapted to receive therewithin a valve member 21 which is of general mushroom shape having a depending and tapering portion 22 and an overhanging portion 23. This valve member 21 may be made of metal and is free to move upwardly and downwardly within the tubular element 20 and between that member and the walls of the dome-like cavity of the pulsator R. The pulsator R is provided with a pair of flattened or beveled side surfaces which permit the same to be slid onto the adapter ring 17 and between a lock screw 24 and a pair of upstanding engaging members (not shown) on the upper surface of the adapter ring. In this manner the pulsator R may be secured to any type of milking machine lid. It is contemplated, of course, that lids which will be manufactured in the future in conjunction with this invention will be so constructed as to eliminate the adapter ring and the pulsator R will be mounted directly upon the lid in superimposed relation to the tubular member 20 as shown in Fig. 4.

It should be noted that the upstanding tubular member 20 provides fluid communication between the interior of the milking machine pail and the dome-like cavity of the pulsator so that when the pulsator is operated the reduction in pressure within the cavity of the pulsator will be transmitted to the interior of the milking machine pail P and air will pass upwardly through the tubular element 20 and be exhausted by the pulsator R. When this is taking place the valve member 21 will be in the raised position shown in Fig. 2. As the pulsator pulsates, this valve member 21 will move upwardly and downwardly, moving to the downward and closed position during the interval when air is not being exhausted.

In use, the cover member C is mounted upon the pail P in the position shown in Fig. 2 and the pulsator is connected to the air exhausting equipment (not shown). As air is exhausted from the dome-like cavity in the interior of the pulsator, the valve member 21 operates so that the air is exhausted from the interior of the pail P. This reduced pressure in turn is transmitted through the spigots 8 and 9 to the claws, causing the milk to be withdrawn from the teats of the cow and brought into the interior of the pail through spigots 8 and 9. This milk ordinarily flows into the interior of the pail toward the central portion of the latter and usually is accompanied with a considerable amount of milk in spray form. Normally, at least some of this milk in spray form is drawn upwardly into the interior of the pulsator and is contaminated by the latter. In our invention the skirt element 14 is so positioned that the milk strikes the skirt element and is deflected downwardly and away from the path of air flow moving upwardly through the tubular element 20. This is best shown in Fig. 3. In this manner the amount of moisture and milk spray which is drawn upwardly through the tubular element 20 is maintained at a minimum.

In spite of the precautions shown a certain amount of milk spray and moisture in either vapor or condensed form will be drawn upwardly through the tubular element 20 and become contaminated by the interior of the walls of the dome-like cavity of the pulsator R. To prevent the return of this contaminated milk and water, we have provided the upstanding tubular element 20 with an overhanging valve member 21. In this manner the milk spray and water which collects upon the walls of the cavity of the pulsator will drip downwardly and instead of returning to the interior of the milk pail and contaminating the milk within the pail, it collects within the well formed by the skirt 14, the panel 19 and the upstanding tubular element 20. This is best shown in Fig. 2. Thus, it can be readily seen that it is impossible for the contaminated milk and moisture to return to the interior of the pail and thereby contaminate the contents of the latter. When the milking operation has been completed and the lid is removed, it is a simple matter to empty the well and to clean the members forming the same and associated therewith.

It should be noted that the skirt element accomplishes a combined function. It not only serves to deflect the milk away from the point of air exhaustion adjacent the tubular member 20 but it also serves to form the well which acts as a collection chamber in combination with the panel member 19 and the tubular element 20.

Thus, it can be seen that I have provided a lid for a milking machine pail which can be simply and cheaply manufactured and which has highly improved sanitation features. In addition to the fact that the lid member, as shown, greatly increases the sanitation in the handling of the milk, it also provides a structure which accomplishes this purpose that may readily be cleansed itself. The integral formation of the lid member makes it possible for the lid to be cleaned quickly and easily and permits the same to be manufactured relatively cheaply.

It should be noted that my lid member maintains the amount of milk spray and moisture which is withdrawn out of the pail to an absolute minimum and at the same time provides collection facilities for collecting whatever amount of milk is withdrawn into the pulsator to positively prevent its return to the interior of the pail and thereby contaminating the milk. It is believed that this improvement in the construction of a milking machine pail lid is a substantial one in that the problem of contamination of the milk by pulsators has long confronted the milking machine industry. Our lid is relatively simple to construct and yet highly efficient in maintaining the milk in a sanitary condition.

It will, of course, be understood that various changes may be made in the form, details, arrangement and proportions of the parts without departing from the scope of my invention.

What I claim is:

1. In a lid for a milking machine pail having an opening, a cover member adapted to fit over the opening of such pail, said cover member having at least one milk inlet in its outer portions and having a depressed medial portion, said cover member having a symmetrically disposed upstanding tubular central portion surrounded by said depressed medial portion and connected directly thereto to cooperatively form a well for the collection of liquid therewithin and being adapted to have a pulsator mounted thereupon in superimposed relation with the interior of said pulsator in fluid communication with said well, said tubular central portion being adapted to have a valve member associated therewith and to permit air to be drawn upwardly therethrough from the pail by the pulsator when the latter is so mounted.

2. In a lid for a milking machine pail having an opening, a cover member adapted to fit over the opening of such pail, said cover member having in combination a marginal flange element, a skirt element connected to said flange element and depending from the interior portions thereof, an upstanding tubular element disposed centrally of said skirt element and surrounded thereby and having an upper end portion, a valve member carried by said tubular member, said valve member being adapted to close said upper end portion of said tubular member, and a panel element connecting said skirt with said tubular element a substantial distance from the upper portions of each and cooperatively forming therewith a well around said tubular element, said cover member being adapted to have a pulsator mounted thereupon in superimposed relation and with the interior of the pulsator in fluid communication with said well whereby the fluids which normally accumulate within the interior of such a pulsator will be collected in said well and prevented from returning into the pail and contaminating the milk therewithin.

3. Structure for preventing contamination of milk in a milking machine pail having a cover with a recess in its central portion and at least one milk inlet in its outer portion and being adapted to have a pulsator mounted thereupon in superimposed relation thereto above said recess, said structure having in combination a well-like member connected to the cover along the portions thereof which define such recess and depending therefrom, said well-like member having a centrally disposed upstanding tubular element mounted within its bottom and providing communication between the pail and the pulsator when the latter is so mounted, the interior of said well-like member communicating with the interior of the pulsator when the latter is so mounted, and a gravity actuated valve member carried by said tubular element, said valve member normally functioning to close said tubular element and being movable by the pulsator to open position, said tubular element being adapted to have air drawn upwardly therethrough and past said valve member by the pulsator when the latter is so mounted and operated.

4. In a lid for a milking machine pail having an opening, a cover member adapted to fit over the opening of such pail and having at least one milk inlet formed therein extending diagonally, inwardly and downwardly, said cover member being comprised of a single sheet of metal and including a marginal flange element, a skirt element connected to said flange element and depending from the interior portions thereof adjacent said inlet, to direct the flow of milk outwardly therefrom, an upstanding tubular element disposed centrally of said skirt element and surrounded thereby, said panel element connecting said skirt with said tubular element a substantial distance from the upper portions of each and forming a well around said tubular element, said cover member being adapted to have a pulsator mounted thereupon in superimposed relation and with the interior of the pulsator in fluid communication with said well whereby the fluids which normally accumulate within the interior of such a pulsator will be collected in said well and prevented from returning into the pail and contaminating the milk therewithin.

5. In a lid for a milking machine pail having an opening, a cover member comprised of a single sheet of metal and adapted to fit over the opening of such pail, said cover member having at least one milk inlet in its outer portions and having a depressed medial portion adjacent said inlet, said cover member having a symmetrically disposed upstanding tubular central portion surrounded by said depressed medial portion and connected thereto to cooperatively form a well for the collection of liquid therewithin, said tubular central portion being substantially cylindrical in shape and being adapted to receive an overhanging valve member therewithin and to permit air to be drawn upwardly therethrough from the pail by a pulsator, said depressed medial portion having downwardly extending walls which serve to effectively direct the milk as it enters through said milk inlet toward the bottom of the pail and away from said tubular central portion.

6. In a lid for a milking machine pail having an opening, a cover member adapted to fit over the opening of such pail, said cover member having at least one inwardly and downwardly directed milk inlet in its outer portions and having a depressed medial portion extending downwardly adjacent the inner end of said inlet and having downwardly extending walls encircling said medial portion and forming a depending annular skirt adjacent the inner end of said milk inlet, said cover member having an upstanding tubular central portion surrounded by said depressed medial portion to form a well, said upstanding tubular central portion being adapted to receive a valve member therein and to permit air to be withdrawn upwardly therethrough by a pulsator, said flange skirt serving to effectively direct the milk passing inwardly through said milk inlet downwardly toward the bottom of the pail and away from said upstanding tubular central portion.

7. Milking machine apparatus for use in conjunction with a milking machine pail having an opening, said apparatus having in combination a cover member adapted to fit over the opening of such pail, said cover member having at least one milk inlet in its outer portions and having a depressed medial portion, said cover member having an upstanding tubular central portion surrounded by said depressed medial portion and connected directly thereto to cooperatively form a well for the collection of liquid therewithin, a valve member carried by said tubular central portion and functioning to open and close the same to preclude a return down-flow of fluid therethrough, and a pulsator having a suction cavity therein mounted on said cover member in fluid-tight relationship with its suction cavity directly above said tubular portion and said valve member with said cavity in communication with said well to permit air to be drawn upwardly through said tubular central portion from the pail by said pulsator when said cover member is fitted over the opening of such pail.

8. Milking machine apparatus for use in conjunction with a milking machine pail having an opening, said apparatus having in combination a cover member adapted to fit over the opening of such pail, said cover member having at least one milk inlet in its outer portions and having a depressed medial portion, said cover member having an upstanding tubular central portion surrounded by said depressed medial portion and connected thereto to cooperatively form a well for the collection of liquid therewithin, a valve member carried by said tubular central portion and functioning to open and close the same, and a pulsator mounted directly upon said cover member in superimposed relation to its tubular portion with the interior of said pulsator being in fluid communication with said well and with the area surrounding said valve member to permit air to be drawn upwardly through said tubular portion from the pail by said pulsator when the cover is fitted over the opening of such pail.

References Cited in the file of this patent

UNITED STATES PATENTS

| Number | Name | Date |
|---|---|---|
| 1,111,562 | Burrell | Sept. 22, 1914 |
| 1,383,369 | Babson | July 5, 1921 |
| 1,530,412 | Ridd | Mar. 17, 1925 |
| 1,786,846 | Hodsdon | Dec. 30, 1930 |
| 2,481,606 | Maes | Sept. 13, 1949 |
| 2,555,543 | Hodsdon | June 5, 1951 |
| 2,581,530 | Harstick | Jan. 8, 1952 |
| 2,613,637 | Crawford | Oct. 14, 1952 |

FOREIGN PATENTS

| Number | Country | Date |
|---|---|---|
| 25,905 | New Zealand | May 4, 1909 |